(12) United States Patent
Chmiel et al.

(10) Patent No.: US 8,270,388 B2
(45) Date of Patent: Sep. 18, 2012

(54) METHOD FOR ACCELERATING SYSTEM INFORMATION ACQUISITION

(75) Inventors: Mieszko Chmiel, Wroclaw (PL); Thomas Stadler, Vienna (AT)

(73) Assignee: Nokia Siemens Networks Oy, Espoo (FI)

( * ) Notice: Subject to any disclaimer, the term of this patent is extended or adjusted under 35 U.S.C. 154(b) by 292 days.

(21) Appl. No.: 12/746,001

(22) PCT Filed: Dec. 3, 2008

(86) PCT No.: PCT/EP2008/066707
§ 371 (c)(1),
(2), (4) Date: Jun. 21, 2010

(87) PCT Pub. No.: WO2009/071583
PCT Pub. Date: Jun. 11, 2009

(65) Prior Publication Data
US 2010/0272015 A1    Oct. 28, 2010

(30) Foreign Application Priority Data
Dec. 5, 2007    (EP) .................................. 07023589

(51) Int. Cl.
*H04J 3/00*    (2006.01)
(52) U.S. Cl. ......... 370/345; 370/347; 370/315; 370/350
(58) Field of Classification Search .................. 370/345, 370/328, 347, 315, 350
See application file for complete search history.

(56) References Cited

U.S. PATENT DOCUMENTS

| 8,155,680 | B2* | 4/2012 | Hirano et al. | 455/502 |
|---|---|---|---|---|
| 2005/0249141 | A1* | 11/2005 | Lee et al. | 370/312 |
| 2008/0232404 | A1* | 9/2008 | Fischer | 370/498 |
| 2008/0318566 | A1* | 12/2008 | Chun et al. | 455/422.1 |
| 2009/0207774 | A1* | 8/2009 | Lee et al. | 370/312 |
| 2010/0202382 | A1* | 8/2010 | Park et al. | 370/329 |
| 2010/0272037 | A1* | 10/2010 | Lee et al. | 370/329 |
| 2011/0103292 | A1* | 5/2011 | Pasad et al. | 370/315 |

FOREIGN PATENT DOCUMENTS

| DE | 10 2005 041273 A1 | 3/2007 |
|---|---|---|
| WO | WO-2006/104346 A | 10/2006 |

OTHER PUBLICATIONS

R1-075113 "LS on the contents on P-BCH" 3GPP TSG RAN WG1 Meeting #51 Jeju, Korea, Nov. 5-9, 2007, 1 page.
Nokia , Nokia Siemens Networks: "R1-074319 Signaling PCH, RACH response and dynamic BCH IN DL-CCH" 3GPP TSG RAN WG1 #50BIS Meeting, Oct. 8-12. 2007. XP002483481.

* cited by examiner

*Primary Examiner* — Huy D Vu
*Assistant Examiner* — Omer Mian
(74) *Attorney, Agent, or Firm* — Harrington & Smith

(57) ABSTRACT

Method for transmitting system information from a base station BS, eNB to a user equipment UE, the method includes transmitting a system information SI within a period p, which system information comprises a first part of information MIB, wherein the first part of information comprises an identifier ID, which identifier identifies a modification status of the first part of information MIB, and adapting a boundary b upon which the period p terminates, and upon which a modified system information SI is valid, wherein adapting a boundary b is carried out based on the modification status of the first part of information MIB.

17 Claims, 3 Drawing Sheets

METHOD FOR ACCELERATING SYSTEM INFORMATION ACQUISITION

FIELD OF THE INVENTION

The present invention relates to a method for accelerating system information acquisition, to a base station and a user equipment for carrying out the method.

BACKGROUND OF THE INVENTION

A Scheduling Unit (SU) is a radio resource control (RRC) message carrying a number of System Information Blocks (SIBs) that have the same scheduling requirements (i.e. periodicity). Each SIB contains a set of related system information parameters. Several SIBs have been defined including the Master Information Block (MIB), that includes a limited number of most frequently transmitted parameters, and the Scheduling Block (SB) that mainly indicates when the other system information is transmitted i.e. start times. The MIB is carried on a Broadcast Chanel (BCH) while all other SIBs (including the SB) are carried on a Down Link Shared Chanel (DL-SCH).

The system information (SI) is transmitted periodically by the Base Station (BS) or the evolved Node B (eNB) and must be read by UEs both in IDLE mode and Connected mode.

UEs which have been powered on and are therefore in one of these modes are informed about a coming SI change as described above, either by paging or by BCCH-RNTI. Most of these UEs have stored the previous SI and can continue with this SI until the modification period boundary. The Broadcast Control Chanel (BCCH) modification period is expected to be in the order of several seconds, maybe up to some tens of seconds. This is to allow reliable reading of SI which includes the possibility to receive retransmissions of the SUs.

While the length of the BCCH modification period is considered unproblematic, initial reading of SI can lead to very long delays, for the reason described in the following.

SUMMARY OF THE INVENTION

It would be desirable to provide an accelerating system information acquisition. The identified problem is strongly linked to the mechanism of SI reading and providing SI change notification to the UE agreed in 3GPP for Long Term Evolution (LTE). This type of problem is therefore new in LTE.

The invention provides a method and device, i.e. a base station and a user equipment for accelerating a system information acquisition, a corresponding programme element and computer readable medium, according to the subject matter of the independent claims. Further embodiments are incorporated in the dependent claims.

According to an exemplary embodiment, there is provided a method for transmitting system information from a base station (BS, eNB) to a user equipment (UE), the method comprising: transmitting a system information (SI) within a period (p), which system information comprises a first part of information (MIB), wherein the first part of information comprises an identifier (ID), which identifier identifies a modification status of the first part of information (MIB); and adapting a boundary (b) upon which the period (p) terminates, and upon which a modified system information (SI) is valid, wherein adapting a boundary (b) is carried out based on the modification status of the first part of information (MIB). Thus, the boundary can be preponed to an earlier point of time, so that the respective values become valid much earlier. For UEs performing initial reading of SI when decoding information in MIB has changed the time to achieve valid SI can be reduced significantly. Thus, the acquisition of system information may be accelerated. Further, long waiting periods can be avoided.

According to an exemplary embodiment, there is provided a method, wherein if the identifier (ID) identifies that the first part of information (MIB) has been modified, the boundary is preponed.

E.g. e MIB includes information how to decode the remaining information, e.g. the SU. However, in order to maintain a synchronous operation of all UEs in a cell, the validation of modified information should take place at a common boundary. If modifying the MIB, the boundary will be preponed in order to achieve faster validation. It should be noted that the BS/eNB and the UEs operate synchronous and should consider a synchronous preponing of the boundary.

According to an exemplary embodiment, there is provided a method, wherein the system information (SI) comprises a second part of information (SU), wherein only one of the first part of information (MIB) and the second part of information (SU) will be modified within a period (p).

Thus, a modification of e.g. a SU and a MIB at the same time can be avoided. When modifying the MIB, the UE may operate with the previous SU in order to avoid mismatch.

According to an exemplary embodiment, there is provided a method, wherein the first part of information (MIB) comprises decoding information, which decoding information serves for decoding the second part of information (SU).

Thus, the MIB may serve as a ruler for the SI, in particular for the decoding of a first SU. The first SU may also serve as a ruler for subsequent SUs, e.g. a second, third and fourth SU.

According to an exemplary embodiment, there is provided a method, wherein the identifier (ID) comprises a bit, identifying a short boundary (sb) and a long boundary (lb). Thus, only one single bit is necessary to assign a value of a larger N. If providing only one bit, two predetermined values of N may be provided. However, when providing for example two bits, in total four predetermined values may be provided, for example for other tasks than those of the present invention.

According to an exemplary embodiment, there is provided a method, wherein the boundary (b) is determined to be present, if the following relation is fulfilled: SFN mod N=X, wherein the SFN is a System Frame Number (SFN), N is a value corresponding to the identifier (ID), and X is an predetermined value.

This operation may serve for a simple synchronization of the BS/eNB and the UEs. The operation will be carried out on both the BS/eNB and the respective UEs. Thus, both, the BS/eNB and the respective UEs will apply the preponed boundary at the same time, so that a synchronous validation of modified information takes place.

According to an exemplary embodiment, there is provided a method, wherein the identifier (ID) identifies at least two states, a first state of which indicates that the first part of information (MIB) has been changed, and a second state of which indicates that the first part of information (MIB) has not been changed, wherein the first state is assigned to a first predetermined value of N and wherein the second state is assigned to a second predetermined value of N.

According to an exemplary embodiment, there is provided a method, wherein the first predetermined value of N is substantially short than the second predetermined value of N.

To provide a first value of N of for example 24 and a second predetermined value of N of for example 1000, allows to significantly shorten the period p, if a modification of MIB had been carried out, thus leading to a faster validation.

According to an exemplary embodiment, there is provided a method, wherein the first part of information (MIB) and the second part of information (SU) is transmitted with different periodicity, and wherein a period (p1) of the first part of information (MIB) is shorter than a period (p2) of the second part of information (SU).

According to an exemplary embodiment, there is provided a method, wherein the first part of information (MIB) is a Master Information Block, and wherein the second part of information (SU) is a Scheduling Unit.

According to an exemplary embodiment, there is provided a programme element, which, when being executed by a processor, is adapted to carry out the inventive method.

According to an exemplary embodiment, there is provided a method, computer readable medium having stored the inventive programme element.

According to an exemplary embodiment, there is provided a base station for a mobile communication, the base station comprises: a transmitting unit being designed for transmitting system information (SI) within a period (p), to a user equipment (UE); wherein the system information (SI) comprises a first part of information (MIB), wherein the first part of information comprises an identifier (ID), which identifier identifies a modification status of the first part of information (MIB); and an adapting unit being designed for adapting a boundary (b) upon which the period (p) terminates, and upon which a modified system information (SI) is valid, wherein the adapting unit is designed for adapting the boundary (b) based on the modification status of the first part of information (MIB).

According to an exemplary embodiment, there is provided a bases station, wherein the system information (SI) comprises a second part of information (SU), wherein the transmitting unit is designed for ensuring that only one of the first part of information (MIB) and the second part of information (SU) will be modified within a period (p).

According to an exemplary embodiment, there is provided a bases station, wherein the adapting unit is designed for determining the boundary (b), based on whether the following relation is fulfilled: SFN mod N=X, wherein the SFN is a System Frame Number (SFN), N is a value corresponding to the identifier (ID), and X is an predetermined value.

According to an exemplary embodiment, there is provided a bases station, wherein the identifier (ID) identifies at least two states, a first state of which indicates that the first part of information (MIB) has been changed, and a second state of which indicates that the first part of information (MIB) has not been changed, wherein the first state is assigned to a first predetermined value of N and wherein the second state is assigned to a second predetermined value of N, which first predetermined value of N and second predetermined value of N are stored in the base station (BS, eNB).

According to an exemplary embodiment, there is provided a user equipment for a mobile communication, the user equipment comprises: a receiving unit being designed for receiving system information (SI) within a period (p), from a base station (BS, eNB); wherein the system information (SI) comprises a first part of information (MIB), wherein the first part of information comprises an identifier (ID), which identifier identifies a modification status of the first part of information (MIB); an adapting unit being designed for adapting a boundary (b) upon which the period (p) terminates, and upon which a modified system information (SI) is valid, wherein the adapting unit is designed for adapting the boundary (b) based on the modification status of the first part of information (MIB).

According to an exemplary embodiment, there is provided a user equipment, wherein the adapting unit is designed for determining the boundary (b), based on whether the following relation is fulfilled: SFN mod N=X, wherein the SFN is a System Frame Number (SFN), N is a value corresponding to the identifier (ID), and X is an predetermined value.

According to an exemplary embodiment, there is provided a user equipment, wherein the identifier (ID) identifies at least two states, a first state of which indicates that the first part of information (MIB) has been changed, and a second state of which indicates that the first part of information (MIB) has not been changed, wherein the first state is assigned to a first predetermined value of N and wherein the second state is assigned to a second predetermined value of N, which first predetermined value of N and second predetermined value of N are stored in the user equipment (UE) or signalled to the user equipment by the base station.

It should be noted that the following described exemplary embodiments of the invention apply also for the method, the devices, i.e. BS, eNB and UE, the programme element and the computer readable medium.

It should be noted that the above features may also be combined. The combination of the above features may also lead to synergetic effects, even if not explicitly described in detail.

These and other aspects of the present invention will become apparent from and elucidated with reference to the embodiments described hereinafter.

BRIEF DESCRIPTION OF THE DRAWINGS

Exemplary embodiments of the present invention will be described in the following with reference to the following drawings.

DETAILED DESCRIPTION OF EXEMPLARY EMBODIMENTS

Figure 1:
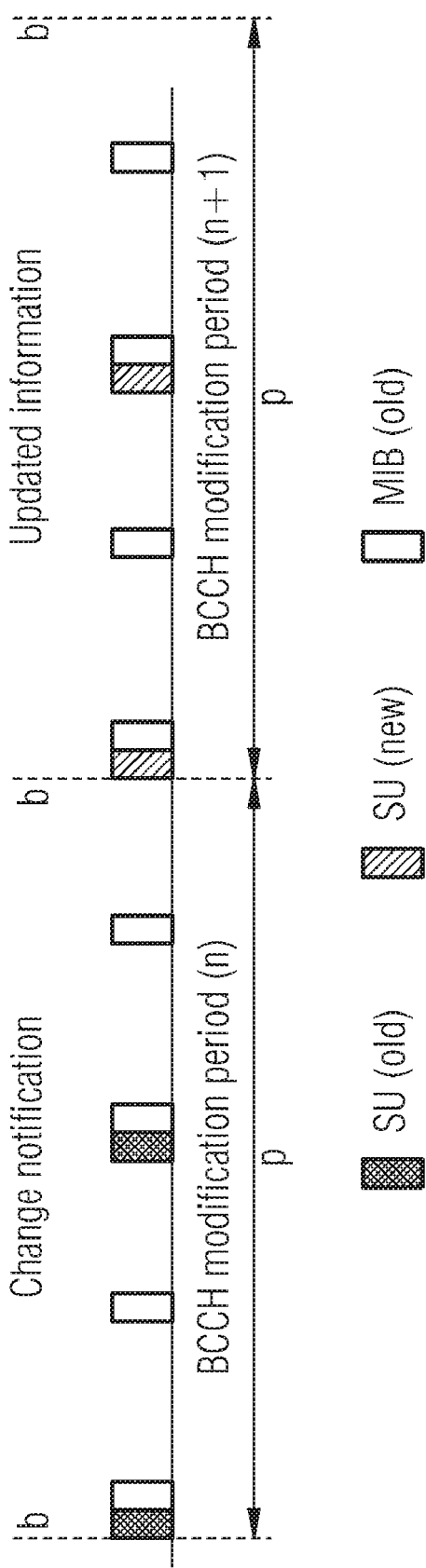
FIG. 1 illustrates the change or modification of System Information (SI).

FIG. 1 illustrates the change or modification of System Information (SI). When the network changes (some of the) system information, it first notifies the UEs about this change i.e. this may be done throughout a modification period. In the next modification period, the network transmits the updated system information. These general principles are illustrated in FIG. 1, in which different colours indicate different system information. When the UE receives a change notification, it knows that the current system information is valid until the next modification period boundary.

Both the MIB and the SU-1 use a fixed schedule with a periodicity of 40 and 80 ms respectively. SU-1 may be scheduled in sub-frame #5 or in multiple sub-frames #5 (frame structure Type 1) or in the first sub-frame (also sub-frame #5) of the second half frame (frame structure Type 2). The scheduling of the SUs other than SU-1 is flexible i.e. dynamic scheduling is used: the User equipment (UE) acquires the detailed time-domain scheduling (as well as other information e.g. frequency-domain scheduling, used transport format) of these scheduling units from the PDCCH. For these other SUs additional scheduling information (indicating starting times) is provided in the SB, which is included in SU-1.

System Information (SI) changes only occur at specific radio frames i.e. the concept of a modification period is used. SUs may be transmitted a number of times with the same content within a modification period, as defined by its scheduling. The modification period boundaries are defined by SFN mod N, wherein SFN is a System Frame Number of an actual frame which is consecutively incremented when a transmission of a subsequent frame begins. N may be configured by system information.

The PAGING message is used to inform UEs in RRC_IDLE about a BCCH change. UEs in RRC_CONNECTED monitor the PDCCH at a periodic occasion specifically defined for this purpose i.e. a 'Connected mode system information change notification' occasion. If the UE detects the BCCH-Change-RNTI, it knows that the system information changes at the next modification period boundary. Although the UE may be informed about changes in system information, no further details are provided e.g. regarding which SU has changed. The change notification mechanism is not used for the system information using an expiry timer (intended for the more dynamic system information).

As explained above UEs which have valid SI will use it until the boundary. The problem which can be solved with this invention exists for the case of initial SI reading (the UE does not have stored any valid SI), which happens e.g. during initial cell/Public Land Mobile Network (PLMN) selection.

For initial SI reading the UE starts to read the MIB which contains information how to decode the SUs. As described above the SI, including MIB, can be changed within the second BCCH modification period (see FIG. 1) but will not be applied before the boundary which comes after this period. A UE reading MIB initially will therefore read the updated SI and try to read also the subsequent SUs but it will apply decoding based on the information contained in MIB (such as e.g. decoding information resources and/or SU-1 scheduling information) as it doesn't have other decoding information from a previous MIB. But as the SUs must still be coded with the currently valid rule to allow reading for UEs which do not perform initial SI reading the UE which performs initial SI reading will not be able to decode the SUs. The UEs performing initial SI reading have therefore to wait until the boundary because this is the time where the new SI and therefore also the new decoding information which is part of MIB becomes valid.

These UEs performing initial SI reading will therefore experience a delay for SI reading of several seconds, if not tens of seconds. It can be expected that this long delay for initial SI reading is not acceptable for operators and will have a negative impact on the user experience e.g. during powering the cell phone up.

The MIB contains information on how to decode the subsequent SUs. The problem exists if this information changes, as described above. The MIB may also contain information on the (system information modification period) boundary. The boundary can be calculated by SFN mod N, where N is agreed to be either fixed in the 3GPP standard or alternatively signalled as part of the MIB. In any case the UE is aware of the next boundary. The idea in this invention is to use the possibility of signalling N (or a pointer to the value of N) to the UE. As described above, N defines the time where the new SI becomes valid. This time shall be short if MIB contents and therefore decoding information for the subsequent SUs has changed. This can be achieved by setting N to a small value. On the other hand if only SUs change, but MIB contents remains unchanged, N can be set to a high value to allow for reliable SU reading.

It is therefore proposed to use 1 bit in the MIB for signalling N to switch the boundary. It is furthermore proposed that MIB contents and SU contents shall never change simultaneously in the same BCCH modification period. (Which is not a big constraint as MIB changes are expected to be seldom e.g. at most once per hour and the MIB reading time is relatively short.)

Figure 2:
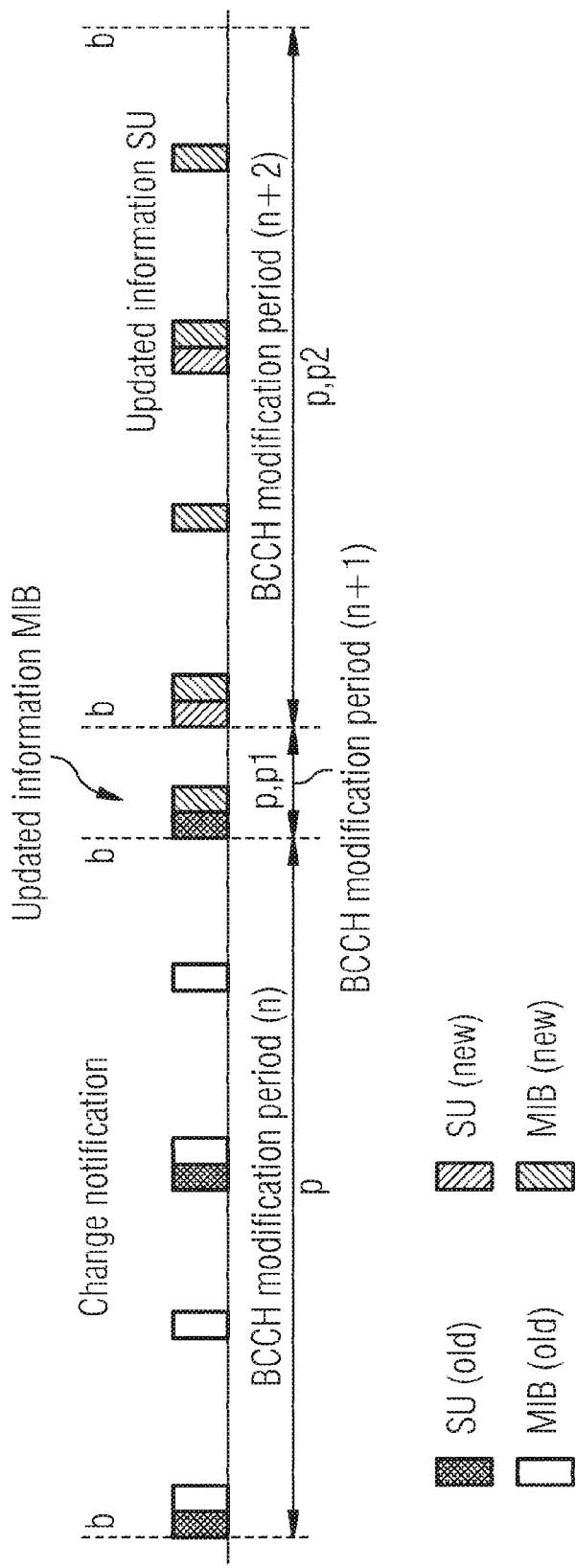
FIG. 2 illustrates the change or modification of System Information (SI) after having detected a change in the MIB.

FIG. 2 illustrates the change or modification of System Information (SI) after having detected a change in the MIB. In the period n+1, the modification has been detected, so that the boundary b has been preponed, i.e. the period p terminated earlier. Thus, the SI becomes valid very much earlier.

For further clarification following 4 cases can be distinguished:

a. UEs performing non initial SI reading and only SU contents changes:

This is the unproblematic case. The UEs are notified of the change and read SU1, MIB and other SUs. While reading they still apply the currently stored SI.

b. UEs performing non initial SI reading and only MIB contents changes:

This again is an unproblematic case. The UEs are notified of the change and read SU1, MIB and other SUs. While reading they still apply the currently stored SI.

c. UEs performing initial SI reading and only SU contents changes:

As the decoding information for the SUs which is contained in MIB has not changed, which is indicated by a large value of N, the UE can read the MIB and the SUs. If the boundary is to close for reading the complete SI the UE can wait until the boundary has been passed and read the SI after the boundary (i.e. after the change becomes effective).

d. UEs performing initial SI reading and only MIB contents changes:

In this case the decoding information for the subsequent SUs can have been changed but not yet applied. Without this invention, as decoding of subsequent SUs before the boundary would fail the UEs had to wait until the boundary has been passed. But the invention proposes that SUs may not be changed together with the MIB and therefore the long reading time for SUs (which is the long BCCH modification period) is not needed. Every UE will be able to read the new MIB in short time as the repetition period for MIB is 40 ms (i.e. within the boundary implied by the shorter value of N). As the UEs performing initial SI reading need to read also other SUs (which have not been changed) the BCCH modification period (limited by the boundary which is given by SFN mod N, where N is the shorter value) shall be as long as needed to receive the MIB reliably. The period must also allow for SU1 transmission for IDLE and Connected mode UEs as they read SU1 first after being notified about a SI change.

Figure 3:
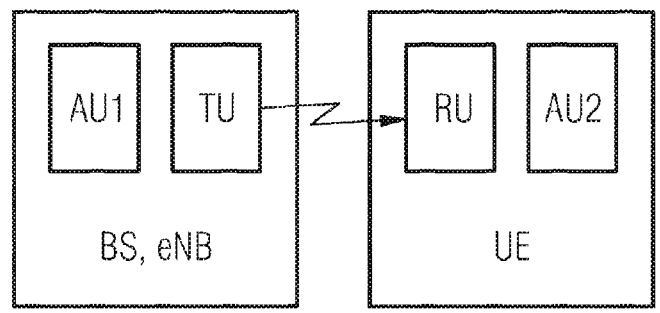
FIG. 3 illustrates a schematic diagram of a base station or eNB and a UE.

FIG. 3 illustrates a schematic diagram of a base station or eNB and a UE. The BS or the eNB may be provided with a transmitting unit TU which is capable of transmitting information to one or a plurality of UEs. The respective UE, only one of which is illustrated for legibility purposes, includes a receiving unit RU. Both, the BS/eNB and the UE also include an adapting unit, which is designed for adapting the boundary. It should be noted that both the BS/eNB and the UE may also include further devices and units, as will be obvious for a skilled person to carry out the other well known procedures for a mobile communication. The communication may also be bidirectional communication between the TU and the RU.

Figure 4:
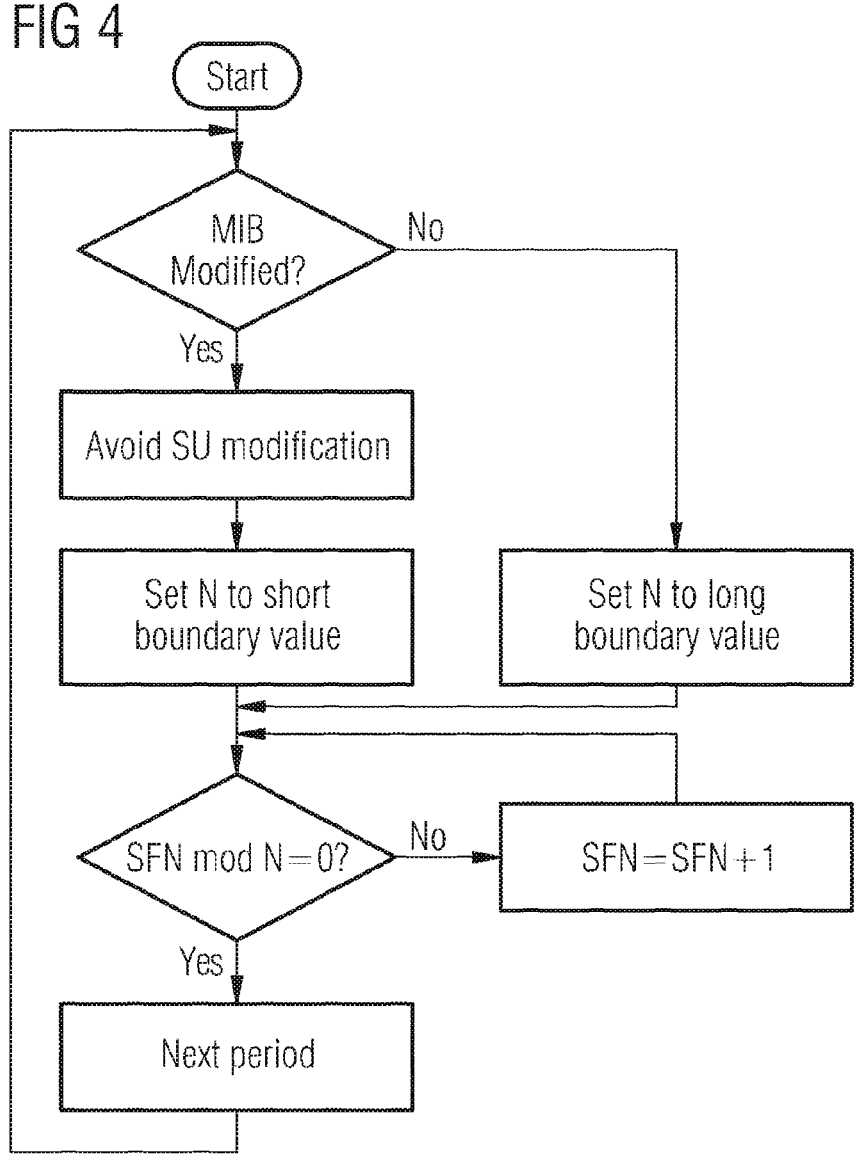
FIG. 4 illustrates a flow chart of the method according to an exemplary embodiment of the invention.

FIG. 4 illustrates a flow chart of the method according to an exemplary embodiment of the invention.

It has been discussed the contents on P-BCH. Part of this information is the configuration of control channels. This configuration information is required in the UE in order to allow for decoding of control information associated with dynamic system information. It has therefore to be signalled as part of P-BCH information.

In "R1-075113, LS on the contents on P-BCH" it has been concluded that decoding information duration is signalled by 1 bit on P-BCH. This value will 'almost never' be changed in the cell. The decoding information resource size which requires 2 bits on P-BCH is expected to change very infrequently (e.g. at most once per hour).

The parameters mentioned in "R1-075113, LS on the contents on P-BCH" may be important for decoding the PDCCH for the SUs. A BCCH modification period for notification is followed by a modification period to read the new system information. Only after a defined boundary the new system information shall be applied. This means that changes in decoding information in MIB can not be applied before the boundary as UEs in IDLE and Connected mode must be able to read SUs. In consequence, if MIB has changed, UEs performing initial MIB reading have to wait for the complete BCCH modification period to acquire system information as the decoding information parameters might have been changed. This will result in very long delays. Although changes of decoding information parameters are rather rare events we consider delays for initial MIB reading of several seconds not acceptable. It may be of relevance whether or not a simple special handling of decoding information updates, as proposed below, would be beneficial.

So far it has not been concluded on the need of parameter N in the MIB, used for calculation of the boundary. In the simplest case 1 bit in MIB would be sufficient to switch between a short and a long predefined value of N. Changes of decoding information parameters shall become valid as soon as possible. It is therefore expected that the modification period needed to read the MIB and SU-1 reliably will be in the order of e.g. 3*80 ms=240 ms. This allows for IDLE and Connected mode UEs to read SU-1 and MIB after being notified about a system information change.

The impact on current agreements shall be kept as small as possible. This is achieved by the long value of N for the case that only SUs will be changed.

The requirement to utilise the short and the long value of N is that decoding information parameter changes and SU changes are not performed within the same modification period. This requirement can be achieved easily as decoding information parameter changes are expected to occur not faster than every hour.

The two values of N could be linked to the repetition periods of SU-1 and the SU with the longest repetition period to allow for reliable reading.

It should be noted that the term 'comprising' does not exclude other elements or steps and the 'a' or 'an' does not exclude a plurality. Also elements described in association with the different embodiments may be combined.

It should be noted that the reference signs in the claims shall not be construed as limiting the scope of the claims.

The invention claimed is:

1. Method for transmitting system information from a base station to a user equipment, the method comprising: transmitting a system information within a period, which system information comprises a master information block (MIB), wherein the master information block comprises an identifier, which identifier identifies a modification status of the master information block; adapting a boundary upon which the period terminates, and upon which a modified system information of the period is valid, wherein adapting a boundary is carried out based on the modification status of the master information block, wherein if the identifier identifies that the master information block has been modified, the boundary is preponed to an earlier point in time.

2. Method of claim 1, wherein the system information comprises a second part of information, wherein only one of the master information block and the second part of information will be modified within a the period.

3. Method of claim 2, wherein the master information block comprises decoding information, which decoding information serves for decoding the second part of information.

4. Method of claim 1, wherein the identifier comprises a bit, identifying a short boundary and a long boundary.

5. Method of claim 1, wherein the boundary is determined to be present, if the following relation is fulfilled: SFN mod N=X, wherein the SFN is a System Frame Number, N is a value corresponding to the identifier, and X is an predetermined value.

6. Method of claim 5, wherein the identifier identifies at least two states, a first state of which indicates that the master information block has been changed, and a second state of which indicates that the master information block has not been changed, wherein the first state is assigned to a first predetermined value of N and wherein the second state is assigned to a second predetermined value of N.

7. Method of claim 6, wherein the first predetermined value of N is substantially shorter than the second predetermined value of N.

8. Method of claim 2, wherein the master information block and the second part of information is transmitted with different periodicity, and wherein a period of the master information block is shorter than a period of the second part of information.

9. Method of claim 2, wherein the second part of information is a Scheduling Unit.

10. A non-transitory computer readable medium having stored a program element, which, when being executed by a processor, is adapted to carry out the method of claim 1.

11. Base station for a mobile communication, the base station comprises: a transmitting unit being designed for transmitting system information within a period, to a user equipment; wherein the system information comprises a master information block, wherein the master information block comprises an identifier, which identifier identifies a modification status of the master information block; an adapting unit being designed for adapting a boundary upon which the period terminates, and upon which a modified system information of the period is valid, wherein the adapting unit is designed for adapting the boundary based on the modification status of the master information block, wherein if the identifier identifies that the master information block has been modified, the bases station is configured such that the boundary is preponed to an earlier point in time.

12. Base station of claim 11, wherein the system information comprises a second part of information, wherein the transmitting unit is designed for ensuring that only one of the master information block and the second part of information will be modified within the period.

13. Base station of claim 11, wherein the adapting unit is designed for determining the boundary (b), based on whether the following relation is fulfilled: SFN mod N=X, wherein the SFN is a System Frame Number, N is a value corresponding to the identifier, and X is an predetermined value.

14. Base station of claim 13, wherein the identifier identifies at least two states, a first state of which indicates that the master information block has been changed, and a second state of which indicates that the master information block has not been changed, wherein the first state is assigned to a first predetermined value of N and wherein the second state is assigned to a second predetermined value of N, which first predetermined value of N and second predetermined value of N are stored in the base station.

15. User equipment for a mobile communication, the user equipment comprises: a receiving unit being designed for receiving system information within a period, from a base station; wherein the system information comprises a master information block, wherein the master information block comprises an identifier, which identifier identifies a modification status of the master information block; an adapting unit being designed for adapting a boundary upon which the period terminates, and upon which a modified system information of the period is valid, wherein the adapting unit is designed for adapting the boundary based on the modification status of the master information block, wherein if the identifier identifies that the master information block has been modified, the user equipment is configured such that the boundary is preponed to an earlier point in time.

16. User equipment of claim 15, wherein the adapting unit is designed for determining the boundary, based on whether the following relation is fulfilled: $SFN \bmod N = X$, wherein the SFN is a System Frame Number, N is a value corresponding to the identifier, and X is an predetermined value.

17. User equipment of claim 16, wherein the identifier identifies at least two states, a first state of which indicates that the master information block has been changed, and a second state of which indicates that the master information block has not been changed, wherein the first state is assigned to a first predetermined value of N and wherein the second state is assigned to a second predetermined value of N, which first predetermined value of N and second predetermined value of N are stored in the user equipment or signaled to the user equipment by the Base station.

* * * * *